(12) United States Patent
Takahashi et al.

(10) Patent No.: US 12,261,402 B2
(45) Date of Patent: Mar. 25, 2025

(54) SPRING CONNECTOR

(71) Applicant: YOKOWO CO., LTD., Tokyo (JP)

(72) Inventors: Kenta Takahashi, Gunma (JP); Yasushi Watanabe, Tokyo (JP); Kenji Endo, Gunma (JP)

(73) Assignee: YOKOWO CO., LTD., Tokyo (JP)

( * ) Notice: Subject to any disclaimer, the term of this patent is extended or adjusted under 35 U.S.C. 154(b) by 201 days.

(21) Appl. No.: 17/922,185

(22) PCT Filed: Apr. 30, 2021

(86) PCT No.: PCT/JP2021/017237
§ 371 (c)(1),
(2) Date: Oct. 28, 2022

(87) PCT Pub. No.: WO2021/225121
PCT Pub. Date: Nov. 11, 2021

(65) Prior Publication Data
US 2023/0178906 A1    Jun. 8, 2023

(30) Foreign Application Priority Data

May 7, 2020   (JP) .................................. 2020-081785

(51) Int. Cl.
*H01R 4/48*     (2006.01)
*H01R 4/60*     (2006.01)

(52) U.S. Cl.
CPC ............. *H01R 4/4863* (2013.01); *H01R 4/60* (2013.01)

(58) Field of Classification Search
CPC ........... H01R 4/48; H01R 4/4863; H01R 4/60

USPC .......................................................... 174/69
See application file for complete search history.

(56) References Cited

U.S. PATENT DOCUMENTS

| 2005/0280433 A1 | 12/2005 | Nelson et al. |
| 2011/0117796 A1 | 5/2011 | Oishi |

FOREIGN PATENT DOCUMENTS

| CN | 200953400 Y | 9/2007 |
| DE | 3012491 C2 | 10/1984 |
| EP | 3164722 A1 | 5/2017 |
| JP | H04-105462 U | 9/1992 |
| JP | H11-162545 A | 6/1999 |
| JP | 2017-526920 A | 9/2017 |
| WO | WO 2011/058646 A1 | 5/2011 |
| WO | WO 2016/047963 A1 | 3/2016 |

OTHER PUBLICATIONS

Jul. 13, 2021, International Search Report issued for related PCT application No. PCT/JP2021/017237.
Jul. 13, 2021, International Search Opinion issued for related PCT application No. PCT/JP2021/017237.

*Primary Examiner* — Tremesha W Burns
(74) *Attorney, Agent, or Firm* — Paratus Law Group, PLLC (57) ABSTRACT

A spring connector includes: a tube; a movable pin having a distal end portion that protrudes from an opening of the tube, and having a hole portion that opens on a side opposite to a protruding direction; and a coil spring configured to bias the movable pin in the protruding direction. The coil spring includes an eccentric winding portion whose winding center is eccentric relative to an axial straight line connecting a winding center of a winding portion at one end portion and a winding center of a winding portion at the other end portion.

9 Claims, 5 Drawing Sheets

SPRING CONNECTOR

CROSS REFERENCE TO PRIOR APPLICATION

This application is a National Stage Patent Application of PCT International Patent Application No. PCT/JP2021/017237 (filed on Apr. 30, 2021) under 35 U.S.C. § 371, which claims priority to Japanese Patent Application No. 2020-081785 (filed on May 7, 2020), which are all hereby incorporated by reference in their entirety.

TECHNICAL FIELD

The present invention relates to a spring connector.

BACKGROUND ART

Figure 13:
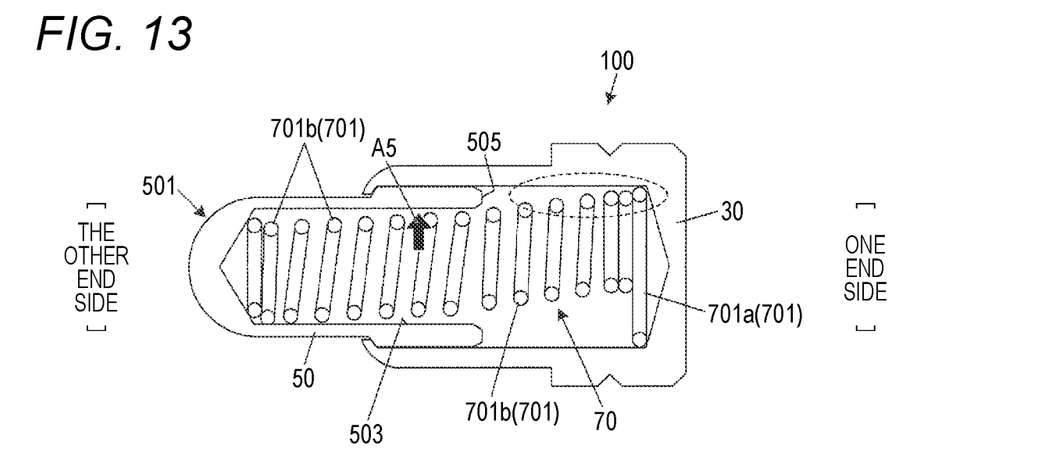
FIG. 13 is a diagram showing a configuration example of a spring connector according to the related art.
Figure 14:
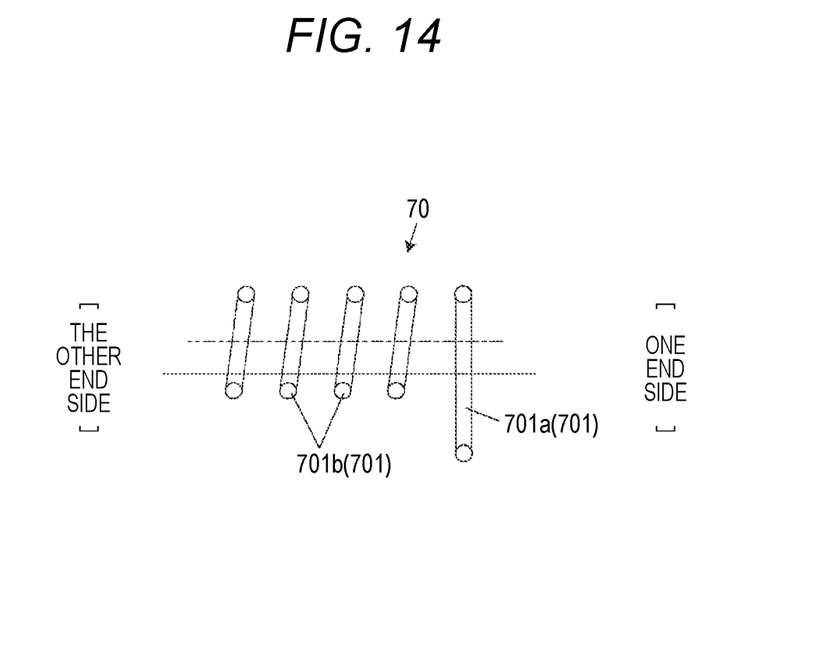
FIG. 14 is an illustration view illustrating a configuration of a coil spring in the spring connector of FIG. 13.

FIG. 13 is a diagram showing a configuration example of a spring connector 100 according to the related art, and is an end view of a tube 30, a movable pin 50, and a coil spring 70, which is obtained by longitudinally cutting the spring connector 100. FIG. 14 is a diagram for illustrating a configuration of the coil spring 70 in a free state in which the coil spring 70 is detached from the spring connector 100, and is an end view of one end portion side of the coil spring 70 that abuts against a bottom portion of the tube 30. As shown in FIG. 13, the spring connector 100 includes the bottomed tube 30, the movable pin 50, and the coil spring 70. The movable pin 50 has a distal end portion 501 that protrudes from an opening of the tube 30, and a hole portion 503 that opens on a side opposite to the protruding direction. One end portion of the coil spring 70 abuts against the bottom portion of the tube 30, and the other end portion of the coil spring 70 abuts against a bottom portion of the hole portion 503, so that the movable pin 50 is biased in the protruding direction.

The coil spring 70 includes a plurality of winding portions 701 (701a, 701b). As shown in FIG. 14, a winding portion 701a at one end portion that abuts against the bottom portion of the tube 30 has a larger diameter than other winding portions 701b. The winding portion 701a is configured such that, in a free state, a winding center (indicated by an one dot chain line) of the other winding portions 701b is eccentrically disposed relative to a winding center (indicated by a dotted line) of the winding portion 701a at the one end portion. On the other hand, as shown in FIG. 13, the tube 30 has an inner diameter that allows the winding portion 701a having a large diameter to be inserted into the tube 30. However, the hole portion of the movable pin 50 has an inner diameter that does not allow the winding portion 701a having a large diameter to be inserted into the hole portion and allows only the winding portion 701b to be inserted into the hole portion. A center of the bottom portion of the tube 30 and a center of the bottom portion of the hole portion 503 of the movable pin 50 are located on a central axis of the spring connector 100. Therefore, in the coil spring 70 accommodated in the spring connector 100, a winding portion 701b in a vicinity of the one end portion is located at a position eccentric from the central axis. In addition, a winding portion 701b in a vicinity of the other end portion that abuts against the bottom portion of the hole portion 503 is located on the central axis or at a position close to the central axis. The coil spring 70 is accommodated in the spring connector 100 in a curved shape in which winding centers of winding portions 701 are gradually shifted as a whole.

When the spring connector 100 is used, the distal end portion 501 is pressed, and the movable pin 50 is pressed into the tube 30. Then, a force in a radial direction indicated by an arrow A5 in FIG. 13 acts, and an outer peripheral surface of the movable pin 50 is pressed against an inner peripheral surface of the tube 30. A direction of the acting force (a direction of the arrow A5) is a direction in which the winding centers of the winding portions 701b are eccentric relative to the winding center of the winding portion 701a, and is a direction in which the coil spring 70 accommodated in the spring connector 100 is curved. Therefore, the tube 30 and the movable pin 50 can be brought into contact with and conducted to each other during use, and a stable electrical connection between the tube 30 and the movable pin 50 can be implemented. The configuration according to the related art as described above is disclosed in Patent Literature 1.

CITATION LIST

Patent Literature

Patent Literature 1: JPH04-105462U

SUMMARY OF INVENTION

Technical Problem

However, in the spring connector 100 according to the related art, the winding portion 701a at the one end portion has a large diameter, and the winding portions 701b other than the winding portion 701a are disposed eccentrically with relative to the winding portion 701a. Therefore, the winding portions 701b on one end side close to the winding portion 701a are positioned in the tube 30, and are positioned close to the inner peripheral surface of the tube 30. During the use in which the distal end portion 501 is pressed and the movable pin 50 is pressed into the tube 30, a force acts in the direction of the arrow A5 in FIG. 13. This force (arrow A5) causes a problem in a part surrounded by a broken line in FIG. 13. The winding portions 701b on the one end side close to the winding portion 701a are positioned in a space behind a rear end surface 505 of the movable pin 50 (in a direction in which the movable pin 50 is pressed during use). Depending on a length and a movement distance of the movable pin 50, the winding portions 701a and 701b on the one end side may hinder the movement of the movable pin 50 in a retracting direction. Accordingly, there is a possibility that the contact stability between the movable pin 50 and the tube 30 is hindered.

An example of an object of the present invention is to provide a technique that can improve the contact stability between a movable pin and a tube.

Solution to Problem

According to an aspect of the present invention, there is provided a spring connector including: a tube; a movable pin having a distal end portion that protrudes from an opening of the tube, and having a hole portion that opens on a side opposite to a protruding direction; and a coil spring configured to bias the movable pin in the protruding direction. The coil spring includes an eccentric winding portion whose winding center is eccentric relative to an axial straight line connecting a winding center of a winding portion at one end portion and a winding center of a winding portion at the other end portion.

DESCRIPTION OF EMBODIMENTS

A preferred embodiment of the present invention will be described with reference to the drawings. The present invention is not limited to the embodiments described below and modes to which the present invention can be applied are not limited to the following embodiments. In the description of the drawings, the same parts are denoted by the same reference signs.

A coil spring of a spring connector in the present embodiment has an eccentric winding portion in an active coil part between winding portions at both end portions thereof. The eccentric winding portion is a portion having a winding center that is eccentric relative to an axial straight line connecting winding centers of the winding portions at both end portions. According to the present configuration, when a distal end portion is pressed and a movable pin is pressed into a tube, an acting force acts to press the movable pin against the tube by at least the eccentric winding portion. Therefore, the movable pin and the tube can be reliably brought into contact with each other during use, and a stable electrical connection between the movable pin and the tube can be implemented. On the other hand, a winding portion on one side of the coil spring does not interfere with the movement of the movable pin. Therefore, the movement range of the movable pin during use can be widened, and the entire length of the spring connector can be shortened accordingly. In addition, the contact stability between the movable pin and the tube can be improved.

First Embodiment

Figure 1:
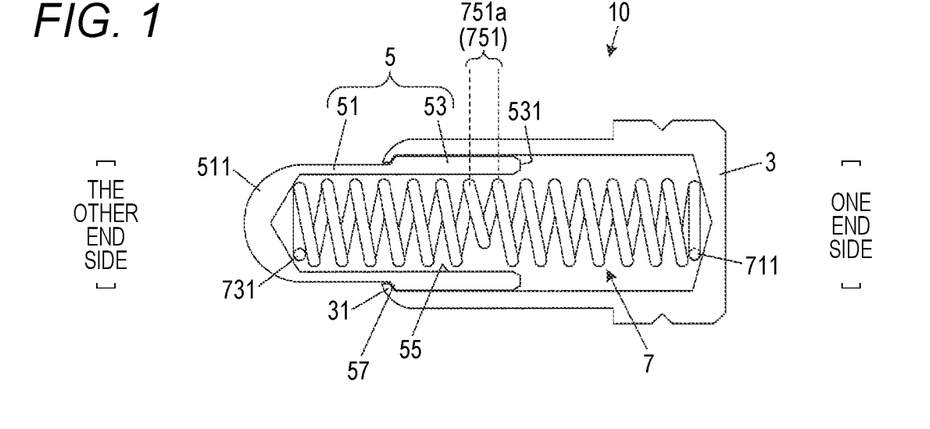
FIG. 1 is a diagram showing a configuration example of a spring connector according to a first embodiment.
Figure 2:
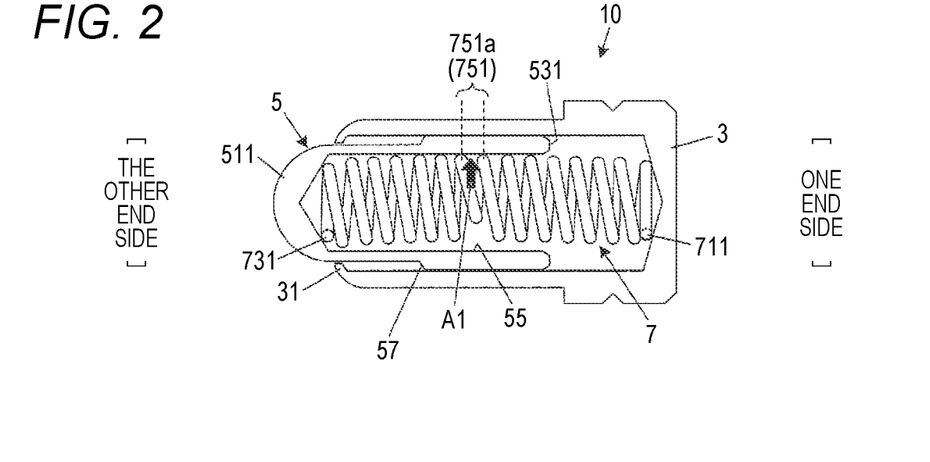
FIG. 2 is another diagram showing the configuration example of the spring connector according to the first embodiment.

FIGS. 1 and 2 are diagrams showing a configuration example of a spring connector 10 according to a first embodiment. FIGS. 1 and 2 are diagrams showing end surfaces of a tube 3 and a movable pin 5 and a side surface of a coil spring 7 by cutting out the tube 3 and the movable pin 5 such that the spring connector 10 is longitudinally cut. FIG. 1 shows a state where the movable pin 5 protrudes (protruding state), and FIG. 2 shows a state where a distal end portion 511 of the movable pin 5 is pressed and retracted into the tube 3 (retracted state). As shown in FIGS. 1 and 2, the spring connector 10 in the first embodiment includes the bottomed tube 3, the movable pin 5, and the coil spring 7. The distal end portion 511 of the movable pin 5 protrudes from an opening of the tube 3. The coil spring 7 biases the movable pin 5 in a protruding direction.

The tube 3 is a bottomed tubular body made of a conductive material (for example, copper, a copper alloy, or the like), and slidably holds the movable pin 5 on the open other end side. The open end of the tube 3 is bent inward by caulking to form a locking portion 31, which suppresses the movable pin 5 from coming off.

The movable pin 5 is made of a conductive material (for example, copper, a copper alloy, or the like). The movable pin 5 includes a small-diameter portion 51 and a large-diameter portion 53 having an outer diameter larger than that of the small-diameter portion 51, and has a hole portion 55 that opens on a side (one end side) opposite to the protruding direction. The small-diameter portion 51 and the large-diameter portion 53 have the same inner diameter. The hole portion 55 having a constant inner diameter is defined by an inner peripheral surface of the small-diameter portion 51 and an inner peripheral surface of the large-diameter portion 53. The distal end portion 511, which is a distal end of the small-diameter portion 51, serves as a contact portion that comes into contact with a terminal to be contacted. The small-diameter portion 51 and the large-diameter portion 53 are configured such that stepped parts of the outer diameter are connected in steps, and a tapered stepped surface 57 between the small-diameter portion 51 and the large-diameter portion 53 abuts against the locking portion 31 of the tube 3 to suppress the movable pin 5 from coming off the tube 3. Therefore, the large-diameter portion 53 is located in the tube 3 even in a state where the small-diameter portion 51 protrudes from the tube 3.

The coil spring 7 is a coil spring, both ends of which are closed ends, and on the both ends, winding portions at both end portions 711, 731 are end coil portions. The coil spring 7 is made of, for example, a piano wire or a stainless steel wire. The coil spring 7 may be made of an insulating material or may be covered with an insulating film. One end portion 711 of the coil spring 7 abuts against a bottom portion of the tube 3, and the other end portion 731 of the coil spring 7 abuts against a bottom portion of the hole portion 55, so that the movable pin 5 is biased in the protruding direction.

Figure 3:
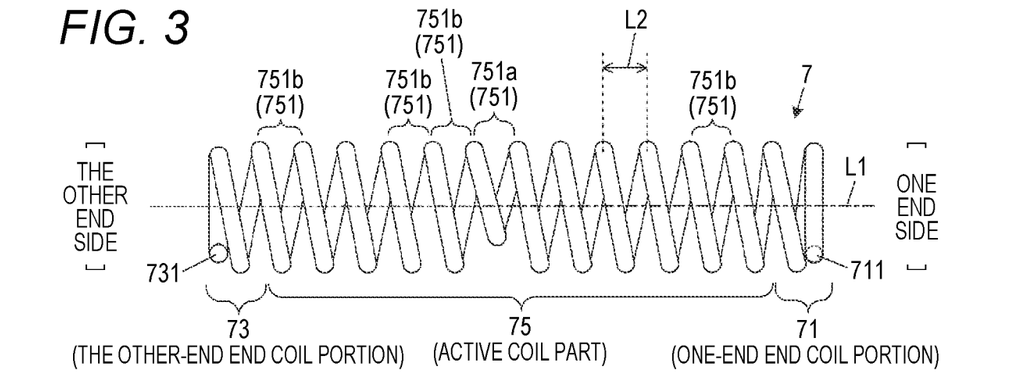
FIG. 3 is an illustration view illustrating a configuration of a coil spring.

FIG. 3 is an illustration view illustrating a configuration of the coil spring 7. FIG. 3 is a side view in which only the coil spring 7 is extracted from the spring connector 10 in the protruding state shown in FIG. 1. As shown in FIG. 3, the coil spring 7 includes an end coil portion 71 at the one end portion 711, an end coil portion 73 at the other end portion 731, and an active coil part 75 between the one end portion 711 and the other end portion 731. Hereinafter, the end coil portion 71 is appropriately referred to as "one-end end coil portion". Hereinafter, the end coil portion 73 is appropriately referred to as "other-end end coil portion".

The active coil part 75 includes a plurality of winding portions 751 (751a, 751b). A part corresponding to one pitch L2 corresponds to one winding portion 751. The winding portion 751 of the active coil part 75 includes an eccentric winding portion 751a whose winding center is eccentric relative to an axial straight line L1 connecting a winding center of the one-end end coil portion 71 and a winding center of the other-end end coil portion 73. That is, the active coil part 75 includes the eccentric winding portion 751a and winding portions 751b whose winding center is on the axial straight line L1 and which is not eccentric. Hereinafter, the winding portion 751b is appropriately referred to as "non-eccentric winding portion". In the first embodiment, one of the winding portions 751 of the active coil part 75 is an eccentric winding portion 751a. The eccentric winding portion 751a is located inside the hole portion 55 in FIGS. 1 and 2, but the eccentric winding portion 751a may be provided outside the hole portion 55. In this case, when the coil spring 7 itself is pressed and bent, a part of the winding portion 751b located inside the hole portion 55 presses the inner side surface of the pin to apply a lateral pressure.

An outer diameter of the eccentric winding portion 751a is smaller than an outer diameter of the winding portion 751 (non-eccentric winding portion 751b) adjacent to the eccentric winding portion 751a. In the first embodiment, all of the non-eccentric winding portions 751b have the same outer diameter, and the outer diameter of the eccentric winding portion 751a is set to be smaller than the outer diameter of the non-eccentric winding portions 751b. In the present embodiment, the eccentric winding portion 751a is provided substantially at a center of the entire length of the coil spring 7 or the active coil part 75, but the position where the eccentric winding portion 751a is provided is not limited thereto.

An outer diameter of the one-end end coil portion 71 is smaller than an outer diameter of a winding portion 751 (non-eccentric winding portion 751b) adjacent to the one-end end coil portion 71. An outer diameter of the other-end end coil portion 73 is smaller than an outer diameter of a winding portion 751 (non-eccentric winding portion 751b) adjacent to the other-end end coil portion 73. In the first embodiment, the one-end end coil portion 71 and the other-end end coil portion 73 have the same outer diameter, and the outer diameter is set to be smaller than that of the non-eccentric winding portion 751b.

Figure 4:
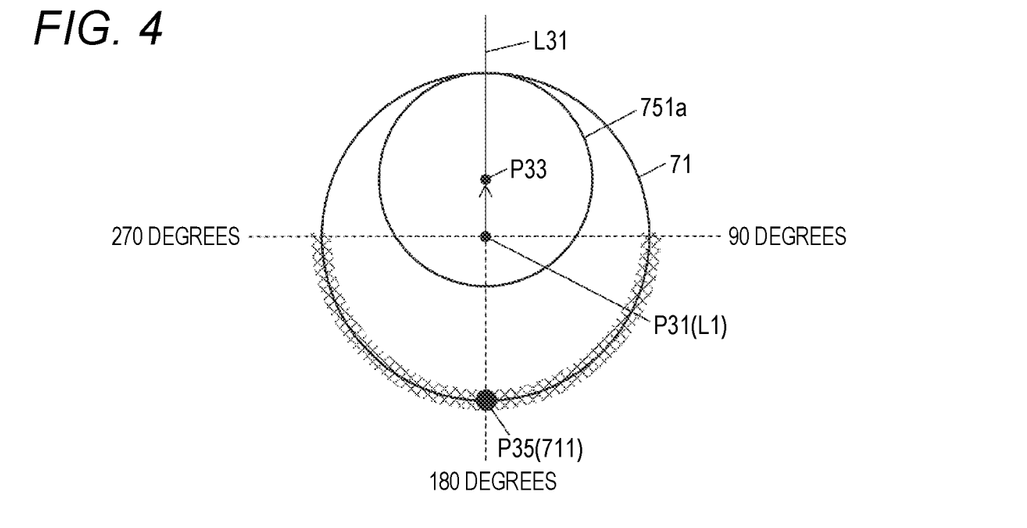
FIG. 4 is an illustration view illustrating a positional condition of one end portion.

Each of the one end portion 711 and the other end portion 731 is a position that satisfies a predetermined positional condition. FIG. 4 is an illustration view illustrating a positional condition of the one end portion 711. FIG. 4 schematically shows a positional relationship between the one-end end coil portion 71 and the eccentric winding portion 751a in a plan view in which the one end portion 711 is viewed from a linear direction of the axial straight line L1 of FIG. 3. The winding of the one-end end coil portion 71 and the eccentric winding portion 751a is indicated by a circle, and the one end portion 711 is indicated by a large black circle P35. In the plan view, a position of the axial straight line L1 is a position corresponding to a center of the one-end end coil portion 71, and is indicated by a base point P31 of a black circle in FIG. 4. In the plan view, a position of the one end portion 711 is determined based on a line (reference line) L31 from the base point P31 indicating the position of the axial straight line L1 toward a winding center P33 of the eccentric winding portion 751a. Specifically, the position of the one end portion 711 is a position where an angle formed by the reference line L31 and a line extending from the base point P31 toward the one end portion 711 is 90 degrees or more and 270 degrees or less in the clockwise direction in the plan view. That is, the position of the one end portion 711 is determined so as to be within an angular range indicated by hatching in FIG. 4, which is 90 degrees or more away from a direction of eccentricity of the eccentric winding portion 751a indicated by an arrow in FIG. 4. For example, in the case of the example illustrated in FIGS. 1 and 2, the positions of the one end portion 711 and the other end portion 731 are determined to be a position P35 at which an angle formed relative to the reference line L31 is 180 degrees. The position P35 can also be said to be a position that is 180 degrees away from the direction of eccentricity.

The position of the other end portion 731 is determined in the same manner. That is, a line from a base point indicating the position of the axial straight line L1 in a plan view, in which the other end portion 731 is viewed from a linear direction of the axial straight line L1, toward the winding center of the eccentric winding portion 751a is set as the reference line. The position of the other end portion 731 is determined as a position at which an angle formed by the reference line and a line extending from the base point toward the other end portion 731 is 90 degrees or more and 270 degrees or less in the clockwise direction in the plan view.

Functions and effects related to the positions of the one end portion 711 and the other end portion 731 will be described. When the distal end portion 511 of the movable pin 5 is pressed and the coil spring 7 contracts, a repulsive force is generated in the coil spring 7 by elasticity. Starting points at which the repulsive force is generated are the one end portion 711 and the other end portion 731 of the coil spring 7. As shown in FIG. 4, the positions of the one end portion 711 and the other end portion 731 are separated more than 90 degrees relative to the direction of eccentricity of the eccentric winding portion 751a indicated by the arrow in FIG. 4, and are 90 degrees or more and 270 degrees or less in the clockwise direction in the plan view. Therefore, the repulsive force generated from the positions of the one end portion 711 and the other end portion 731 acts to move the eccentric winding portion 751a in the direction of the arrow A1 (eccentric direction) in FIG. 2.

By setting the positional relationship between the one end portion 711 and the other end portion 731 and the eccentric winding portion 751a as described above, the coil spring 7 can be reliably bent.

When the spring connector 10 is used, the function and effect as shown in FIG. 2 are obtained. When the terminal to be contacted is pressed against the distal end portion 511 during use, the movable pin 5 moves in a retracting direction, and the coil spring 7 contracts. Then, as shown in FIG. 2, the coil spring 7 is bent in an eccentric direction at a part of the eccentric winding portion 751a. The eccentric direction is a direction indicated by an arrow A1 in FIG. 2, is a direction in which the winding center of the eccentric winding portion 751a is eccentric relative to the axial straight line L1, and is a direction from the base point P31 toward the winding center P33 in the plan view shown in FIG. 4. A force in the eccentric direction (the radial direction indicated by the arrow A1) acts, and an outer peripheral surface of the movable pin 5 (an outer peripheral part of the hole portion 55) is pressed against an inner peripheral surface of the tube 3. Therefore, the movable pin 5 and the tube 3 can be reliably brought into contact with each other during use, and a stable electrical connection between the movable pin 5 and the tube 3 can be implemented. Even if the coil spring 7 contracts, the rear side of the rear end surface 531 of the movable pin 5 (the direction in which the movable pin 5 is pressed in) remains as a space. Therefore, the one end side part of the coil spring 7 does not interfere with the movement of the movable pin 5 in the retracting direction. Therefore, it is possible to provide a technique by which the contact stability of the spring connector 10 can be improved without hindering the movement of the movable pin 5 during use.

Second Embodiment

Figure 5:
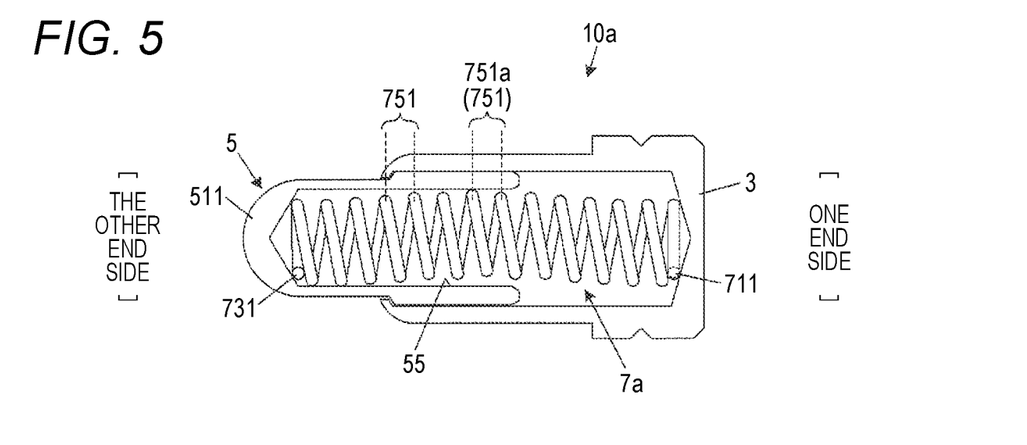
FIG. 5 is a diagram showing a configuration example of a spring connector according to a second embodiment.
Figure 6:
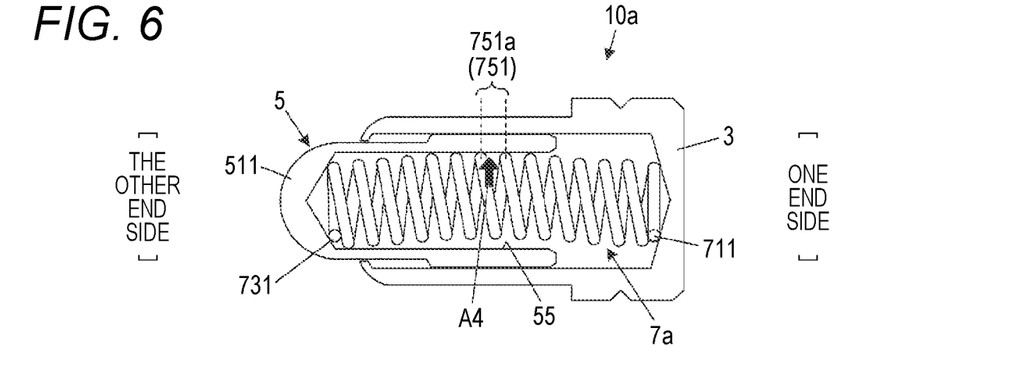
FIG. 6 is another diagram showing the configuration example of the spring connector according to the second embodiment.

FIGS. 5 and 6 are diagrams showing a configuration example of a spring connector 10a according to a second embodiment. FIGS. 5 and 6 are diagrams showing the end surfaces of the tube 3 and the movable pin 5 and the side surface of a coil spring 7a by cutting out the tube 3 and the movable pin 5 such that the spring connector 10a is longitudinally cut. FIG. 5 shows a protruding state of the movable pin 5, and FIG. 6 shows a retracted state of the movable pin 5. As shown in FIGS. 5 and 6, the spring connector 10a in the second embodiment includes the bottomed tube 3, the movable pin 5, and the coil spring 7a, similarly to the first embodiment. The movable pin 5 has the distal end portion 511 that protrudes from the opening of the tube 3, and the hole portion 55 that opens on a side opposite to the protruding direction. One end portion of the coil spring 7a abuts against the bottom portion of the tube 3, and the other end portion of the coil spring 7a abuts against the bottom portion of the hole portion 55, so that the movable pin 5 is biased in the protruding direction.

In the second embodiment, the coil spring 7a has a configuration in which winding centers of respective winding portions 751 of the active coil part are gradually shifted as the distance from the eccentric winding portion 751a is reduced. Specifically, in the example of FIG. 5 or 6, a winding portion 751 in a vicinity of the center, which is a winding portion 751 positioned inside the hole portion 55, corresponds to the eccentric winding portion 751a. The winding portions 751 other than the eccentric winding portion 751a are configured such that winding centers are shifted stepwise from both end sides in the eccentric direction of the eccentric winding portion 751a. Accordingly, the coil spring 7a has a shape in which a longitudinal direction is bent in the eccentric direction as a whole.

In the spring connector 10a, having this configuration, when the movable pin 5 is pressed into the tube 3 by pressing the distal end portion 511 during use, a force acts in a radial direction indicated by an arrow A4 in FIG. 6, which is an eccentric direction of the eccentric winding portion 751a. Then, the eccentric position of the eccentric winding portion 751a is moved so as to be further shifted in the eccentric direction, the coil spring 7a is bent, the winding portion of the eccentric winding portion 751a presses the inner peripheral surface of the hole portion 55, and the outer peripheral surface of the movable pin 5 is pressed against the inner peripheral surface of the tube 3. Therefore, the same effects as those of the first embodiment can be obtained.

Although two embodiments have been described above, modes to which the present invention can be applied are not limited to the above-described embodiments, and components can be appropriately added, omitted, or changed.

For example, the arrangement of the eccentric winding portion 751a in the active coil part 75 of the coil spring is not limited to the arrangement illustrated in each of the above embodiments. FIGS. 7 to 12 are diagrams showing configurations of coil springs 7b, 7c, 7d, 7e, 7f, 7g of a spring connector according to a modification.

Figure 7:
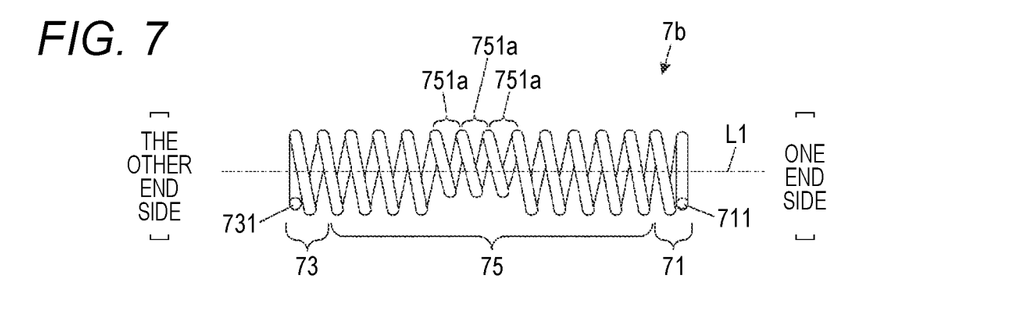
FIG. 7 is a diagram showing a configuration of a coil spring of a spring connector according to a modification.

For example, as shown in FIG. 7, the active coil part 75 may include a plurality of eccentric winding portions 751a. In the example of FIG. 7, three eccentric winding portions 751a are provided. According to this, it is possible to provide the coil spring 7b including the plurality of eccentric winding portions 751a in the active coil part 75.

Figure 8:
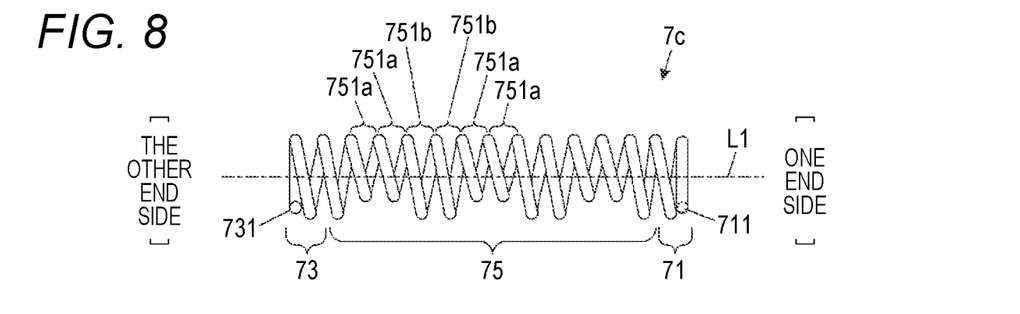
FIG. 8 is a diagram showing a configuration of a coil spring of a spring connector according to another modification.

As shown in FIG. 8, the non-eccentric winding portions 751b and the eccentric winding portions 751a may be alternately arranged to form the active coil part 75. FIG. 8 shows a configuration example of the active coil part 75 in which two non-eccentric winding portions 751b and two eccentric winding portions 751a are alternately arranged. The non-eccentric winding portions 751b and the eccentric winding portions 751a may be alternately arranged one by one. According to this, it is possible to provide the coil spring 7c in which the non-eccentric winding portions 751b and the eccentric winding portions 751a are alternately arranged in the active coil part 75.

Figure 9:
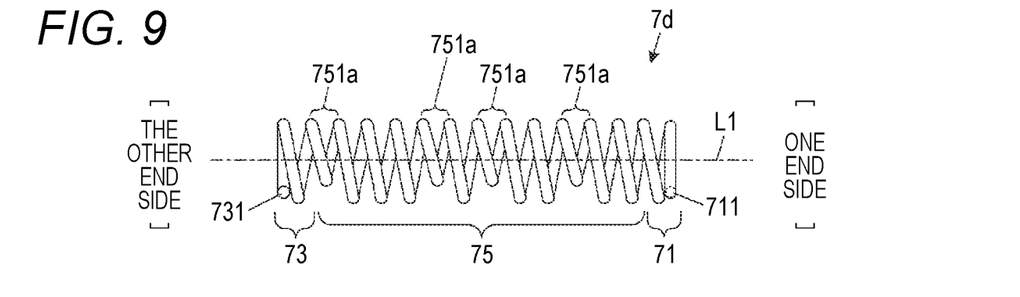
FIG. 9 is a diagram showing a configuration of a coil spring of a spring connector according to yet another modification.

As shown in FIG. 9, the eccentric winding portions 751a in the active coil part 75 may be irregularly arranged. According to this, it is possible to provide the coil spring 7d in which the eccentric winding portions 751a are irregularly arranged in the active coil part 75.

Figure 10:
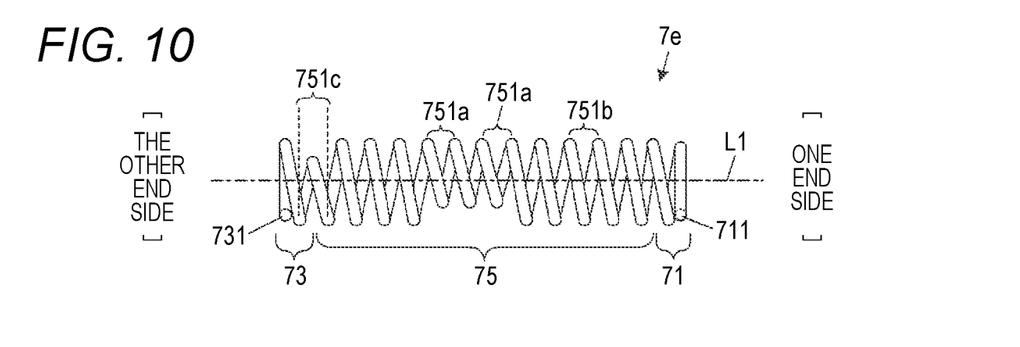
FIG. 10 is a diagram showing a configuration of a coil spring of a spring connector according to still another modification.

As shown in FIG. 10, the active coil part 75 may include a heterogeneous eccentric winding portion 751c in addition to the non-eccentric winding portion 751b and the eccentric winding portion 751a. The heterogeneous eccentric winding portion 751c is a winding portion having a winding center in a direction different from a direction from the base point indicating the position of the axial straight line L1 toward the winding center of the eccentric winding portion 751a in a plan view (see FIG. 4) in which the one end portion 711 or the other end portion 731 of the coil spring is viewed from the linear direction of the axial straight line L1. More specifically, in the plan view, a winding portion having a winding center at a position where an angle formed by the line (reference line) L31 and a line extending from the base point P31 toward a winding center of the heterogeneous eccentric winding portion 751c is 90 degrees or less is the heterogeneous eccentric winding portion 751c. The line (reference line) L31 is a line extending from the base point P31 indicating the position of the axial straight line L1 toward the winding center P33 of the eccentric winding portion 751a. In the example of FIG. 10, the active coil part 75 includes one heterogeneous eccentric winding portion 751c having a winding center in a direction opposite to the direction from the base point toward the winding center of the eccentric winding portion 751a. According to this, it is possible to provide the coil spring 7e including the heterogeneous eccentric winding portion 751c that is eccentric in a direction different from a direction in which the eccentric winding portion 751a is located relative to the axial straight line L1 in the active coil part 75.

Figure 11:
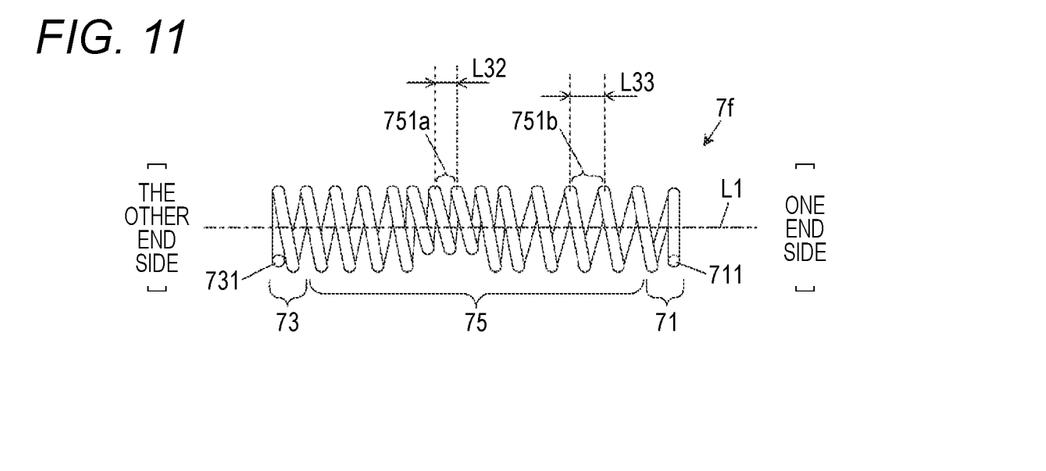
FIG. 11 is a diagram showing a configuration of a coil spring of a spring connector according to a still further modification.

As shown in FIG. 11, pitches of the coil spring 7f may be unequal. Specifically, for example, a pitch L32 of the eccentric winding portion 751a may be smaller than a pitch L33 of the non-eccentric winding portion 751b. Conversely, the pitch L32 of the eccentric winding portion 751a may be larger than the pitch L33 of the non-eccentric winding portion 751b. According to this, the spring connector can be implemented by using the coil spring 7f having unequal pitches.

In addition, the active coil part of the coil spring may include winding portions having different outer diameters.

Figure 12:
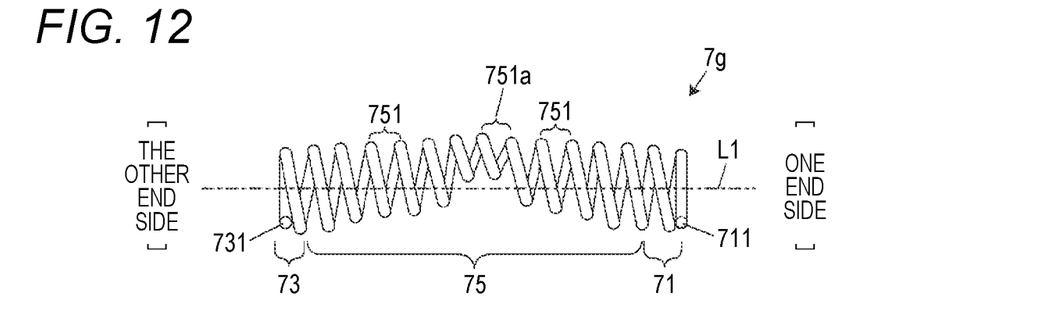
FIG. 12 is a diagram showing a configuration of a coil spring of a spring connector according to yet a still further modification.

For example, as shown in FIG. 12, in the configuration of the coil spring shown in the second embodiment in which the winding centers of the respective winding portions 751 of the active coil part 75 are gradually shifted as the distance from the eccentric winding portion 751a is reduced, outer diameters of the respective winding portions 751 may also be gradually reduced as the distance from the eccentric winding portion 751a is reduced. According to this, it is possible to provide the coil spring 7g including the winding portions 751 having different outer diameters in the active coil part 75.

Further, in the embodiments and the modifications, the coil spring is exemplified in which both ends are closed ends, and on the both ends, winding portions at both end portions are end coil portions. However, a coil spring whose both ends are open ends may be used. The closed end is a winding method in which the end portion is in a state where there is no gap between spring wires. The open end is a winding method in which the end portion is in a state where there is a gap between the spring wires.

A cross-sectional shape of the coil spring constituting the spring connector (the cross-sectional shape of the wire) is not particularly limited, and may be, for example, a circular shape, an elliptical shape, a polygonal shape, or the like. A winding shape of one winding portion (the shape in the plan view of FIG. 4) is not limited to a circular shape, and may be another shape such as a rectangular shape and an elliptical shape.

Several embodiments and modifications thereof have been described. The disclosure can be summarized as follows.

According to an aspect of the present disclosure, there is provided a spring connector including: a tube; a movable pin having a distal end portion that protrudes from an opening of the tube, and having a hole portion that opens on a side opposite to a protruding direction; and a coil spring configured to bias the movable pin in the protruding direction. The coil spring includes an eccentric winding portion whose winding center is eccentric relative to an axial straight line connecting a winding center of a winding portion at one end portion and a winding center of a winding portion at the other end portion.

According to the aspect of the present disclosure, the coil spring includes the eccentric winding portion whose winding center is eccentric relative to the axial straight line connecting the winding centers of the winding portions at both end portions. According to the present configuration, when a distal end portion is pressed and a movable pin is pressed into a tube, an acting force acts to press the movable pin against the tube by at least the eccentric winding portion. Therefore, the movable pin and the tube can be reliably brought into contact with each other during use, and a stable electrical connection between the movable pin and the tube can be implemented. On the other hand, a winding portion on one end side of the coil spring is suppressed from interfering with the movement of the movable pin. Therefore, the movement range of the movable pin during use can be widened, and the entire length of the spring connector can be shortened accordingly. In addition, the contact stability between the movable pin and the tube can be improved.

The one end portion may be located at a position where an angle formed by a line extending from a base point indicating a position of the axial straight line toward the winding center of the eccentric winding portion and a line extending from the base point toward the one end portion is 90 degrees or more and 270 degrees or less in a clockwise direction in a plan view from a linear direction of the axial straight line, and the other end portion may be located at a position where an angle formed by the line extending from the base point toward the winding center of the eccentric winding portion and a line extending from the base point toward the other end portion is 90 degrees or more and 270 degrees or less in the clockwise direction in the plan view.

Both ends of the coil spring may be closed ends.

In the coil spring, an outer diameter of an end coil portion at the one end portion may be smaller than an outer diameter of a winding portion adjacent to the end coil portion, and an outer diameter of an end coil portion at the other end portion may be smaller than an outer diameter of a winding portion adjacent to the end coil portion.

The eccentric winding portion may be located inside the hole portion.

An outer diameter of the eccentric winding portion may be smaller than an outer diameter of a winding portion adjacent to the eccentric winding portion.

The eccentric winding portion may be located in an active coil part between the one end portion and the other end portion, and the outer diameter of the eccentric winding portion may be smaller than an outer diameter of a winding portion other than the eccentric winding portion in the active coil part.

The coil spring may include a plurality of the eccentric winding portions.

The coil spring may include, in the active coil part, a heterogeneous eccentric winding portion having a winding center in a direction different from a direction from the base point toward the winding center of the eccentric winding portion in the plan view.

The eccentric winding portion may be located in an active coil part between the one end portion and the other end portion, and winding centers of respective winding portions of the active coil part may be gradually shifted as a distance from the eccentric winding portion is reduced.

The coil spring may have irregular pitches.

REFERENCE SIGNS LIST 10, 10a Spring connector
3 Tube
5 Movable pin
511 Distal end portion
55 Hole portion
7, 7a, 7b, 7c, 7d, 7e, 7f, 7g Coil spring
71 One-end end coil portion
711 One end portion
73 The other-end end coil portion
731 The other end portion
75 Active coil part
751 Winding portion
751a Eccentric winding portion
751b Non-eccentric winding portion
751c Heterogeneous eccentric winding portion

The invention claimed is:

1. A spring connector comprising:
a tube;
a movable pin having a distal end portion that protrudes from an opening of the tube, and having a hole portion that opens on a side opposite to a protruding direction; and a coil spring configured to bias the movable pin in the protruding direction, wherein the coil spring includes an eccentric winding portion whose winding center is eccentric relative to an axial straight line connecting a winding center of a winding portion at one end portion and a winding center of a winding portion at an other end portion, wherein the one end portion is located at a position where an angle formed by a line extending from a base point indicating a position of the axial straight line toward the winding center of the eccentric winding portion and a line extending from the base point toward the one end portion is 90 degrees or more and 270 degrees or less in a clockwise direction in a plan view from a linear direction of the axial straight line, and the other end portion is located at a position where an angle formed by the line extending from the base point toward the winding center of the eccentric winding portion and a line extending from the base point toward the other end portion is 90 degrees or more and 270 degrees or less in the clockwise direction in the plan view.

2. The spring connector according to claim 1,
wherein both ends of the coil spring are closed ends.

3. The spring connector according to claim 2,
wherein, in the coil spring, an outer diameter of an end coil portion at the one end portion is smaller than an outer diameter of a winding portion adjacent to the end coil portion, and an outer diameter of an end coil portion at the other end portion is smaller than an outer diameter of a winding portion adjacent to the end coil portion.

4. The spring connector according to claim 1,
wherein the eccentric winding portion is located inside the hole portion.

5. The spring connector according to claim 1,
wherein an outer diameter of the eccentric winding portion is smaller than an outer diameter of a winding portion adjacent to the eccentric winding portion.

6. The spring connector according to claim 1,
wherein the eccentric winding portion is located in an active coil part between the one end portion and the other end portion, and an outer diameter of the eccentric winding portion is smaller than an outer diameter of a winding portion other than the eccentric winding portion in the active coil part.

7. The spring connector according to claim 1,
wherein the coil spring includes, in an active coil part, a heterogeneous eccentric winding portion having a winding center in a direction different from a direction from the base point toward the winding center of the eccentric winding portion in the plan view.

8. The spring connector according to claim 1,
wherein the eccentric winding portion is located in an active coil part between the one end portion and the other end portion, and winding centers of respective winding portions of the active coil part are gradually shifted as a distance from the eccentric winding portion is reduced.

9. The spring connector according to claim 1,
wherein the coil spring has irregular pitches.

* * * * *